US012365462B2

(12) United States Patent
Fabry et al.

(10) Patent No.: US 12,365,462 B2
(45) Date of Patent: Jul. 22, 2025

(54) EMERGENCY OXYGEN SYSTEMS FOR INTERNAL CABINS OF AIRCRAFT

(71) Applicant: THE BOEING COMPANY, Chicago, IL (US)

(72) Inventors: Andrew Leo Fabry, Seattle, WA (US); Franco Marino Cagnina, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/732,720

(22) Filed: Apr. 29, 2022

(65) Prior Publication Data
US 2022/0411062 A1    Dec. 29, 2022

Related U.S. Application Data

(60) Provisional application No. 63/216,072, filed on Jun. 29, 2021.

(51) Int. Cl.
*B64D 11/00* (2006.01)
(52) U.S. Cl.
CPC ........ *B64D 11/00* (2013.01); *B64D 2231/025* (2013.01)
(58) Field of Classification Search
CPC ............................................... B64D 2231/025
See application file for complete search history.

(56) References Cited

U.S. PATENT DOCUMENTS

| 4,481,945 A | * | 11/1984 | Levine ............... | B64D 11/0632 |
| | | | | 128/202.13 |
| 7,922,119 B2 | | 4/2011 | Muin | |
| 9,481,332 B1 | * | 11/2016 | Lee ......................... | H02J 9/002 |
| 11,945,588 B2 | * | 4/2024 | Cagnina ............... | B64D 11/003 |
| 2011/0146686 A1 | * | 6/2011 | Schneider ............. | B64D 13/00 |
| | | | | 128/205.25 |
| 2012/0186586 A1 | * | 7/2012 | Gill ...................... | A62B 25/005 |
| | | | | 128/205.25 |

(Continued)

FOREIGN PATENT DOCUMENTS

| EP | 3254967 | | 12/2017 | |
| EP | 3677311 A1 | * | 7/2020 | ............... A62B 7/04 |

(Continued)

OTHER PUBLICATIONS

Extended European Search Report for EP 22181583.0-1004, dated Nov. 8, 2022.
Communication re EP 22181583.0-1004, dated Feb. 18, 2025.

*Primary Examiner* — Joshua D Huson
*Assistant Examiner* — Anna L. Gordon
(74) *Attorney, Agent, or Firm* — Joseph M. Butscher; The Small Patent Law Group LLC

(57) ABSTRACT

A vehicle includes an internal cabin. A plurality of passenger service units (PSUs) are within the internal cabin. An emergency oxygen system is within the internal cabin. The emergency oxygen system is separate and distinct from the plurality of PSUs. A method includes providing a plurality of passenger service units (PSUs) within an internal cabin of a vehicle, and providing an emergency oxygen system within the internal cabin, wherein the emergency oxygen system is separate and distinct from the plurality of PSUs.

20 Claims, 9 Drawing Sheets

(56) References Cited

U.S. PATENT DOCUMENTS

| | | | |
|---|---|---|---|
| 2012/0228426 A1* | 9/2012 | Schneider | B64D 11/003 29/428 |
| 2012/0325217 A1* | 12/2012 | Lang | B64D 11/00 128/205.25 |
| 2013/0026293 A1 | 1/2013 | Schneider | |
| 2014/0137869 A1* | 5/2014 | Schrader | A62B 9/04 128/205.21 |
| 2015/0035424 A1 | 2/2015 | Rittner | |
| 2015/0069182 A1 | 3/2015 | Jacobsen | |
| 2015/0097082 A1* | 4/2015 | Paulino | B64D 11/00 244/118.5 |
| 2015/0166178 A1 | 6/2015 | Savian | |
| 2018/0103554 A1 | 4/2018 | Ibrahim | |
| 2018/0133074 A1* | 5/2018 | Delise | B62D 33/02 |
| 2018/0155035 A1 | 6/2018 | Spagl | |
| 2019/0193871 A1 | 6/2019 | Benthien | |
| 2020/0079524 A1 | 3/2020 | Escobar | |
| 2020/0180765 A1 | 6/2020 | Behr | |
| 2020/0262567 A1* | 8/2020 | Meckes | A62B 7/14 |

FOREIGN PATENT DOCUMENTS

| | | | |
|---|---|---|---|
| EP | 4155207 | 3/2023 | |
| GB | 2237207 A * | 5/1991 | A62B 7/14 |

* cited by examiner

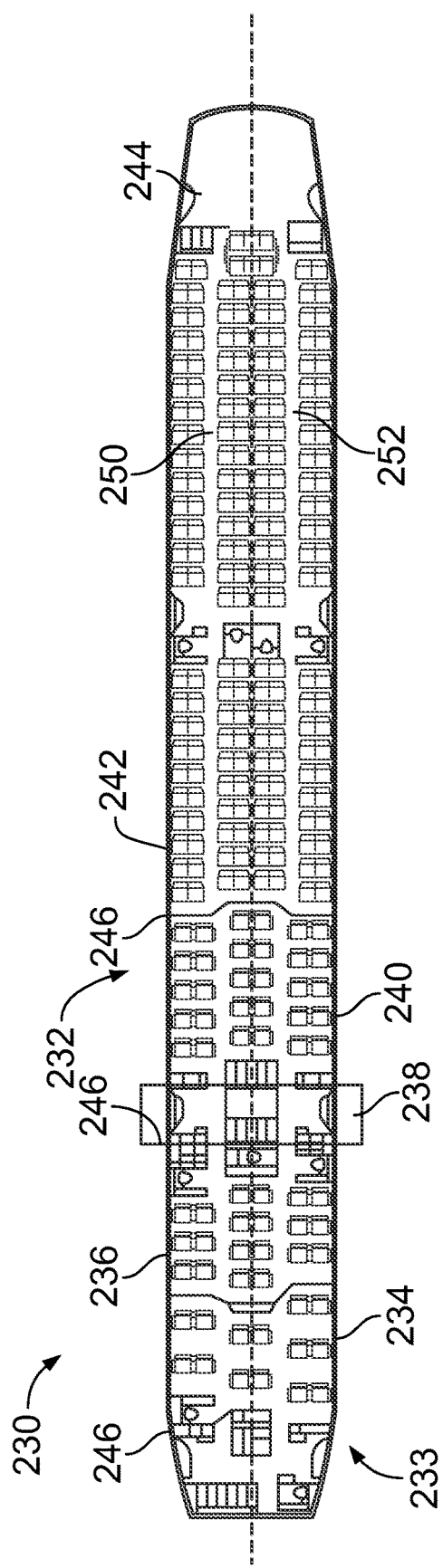
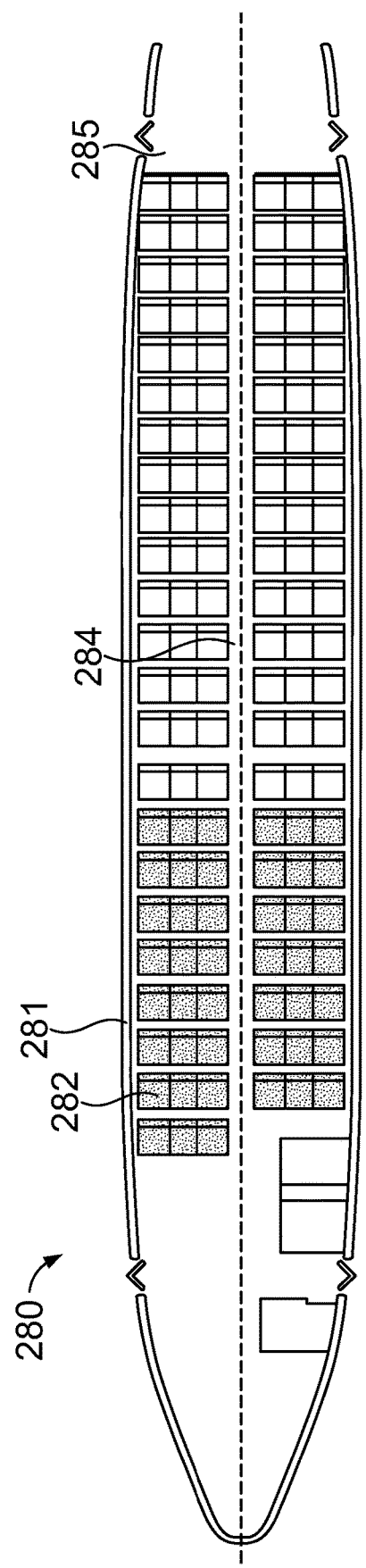
FIG. 3A
FIG. 3B

EMERGENCY OXYGEN SYSTEMS FOR INTERNAL CABINS OF AIRCRAFT

CROSS-REFERENCE TO RELATED APPLICATION

This application is a non-provisional application of U.S. Patent Application No. 63/216,072, filed Jun. 29, 2021, and the entire disclosure of which is incorporated herein by reference.

FIELD OF THE DISCLOSURE

Embodiments of the present disclosure generally relate to emergency oxygen systems for internal cabins of aircraft.

BACKGROUND OF THE DISCLOSURE

Vehicles such as commercial aircraft are used to transport passengers between various locations. Emergency oxygen assemblies are provided within internal cabins of commercial aircraft. In the event of a predetermined depressurization within an internal cabin, the emergency oxygen assemblies are configured to deploy so that passengers are able to breathe therefrom.

Typically, the emergency oxygen assemblies, including masks and conduits, are housed within passenger service units (PSUs), which are disposed above seats within the internal cabin. As can be appreciated, the emergency oxygen assemblies occupy space within the PSUs, thereby precluding other components from being housed within the PSUs.

Additionally, internal cabins of certain commercial aircraft can be reconfigured as desired. For example, spacing or pitch between seats within the internal cabin can changed. After reconfiguration, the emergency oxygen assemblies within the PSUs may not be aligned with respective seats. Accordingly, additional time and labor is typically required to adjust the emergency oxygen assemblies in relation to the reconfigured seats.

SUMMARY OF THE DISCLOSURE

A need exists for a system and method for freeing up space within PSUs. Further, a need exists for ensuring emergency oxygen assemblies are easily and readily available within an internal cabin of an aircraft even if seats within the internal cabin are reconfigured (for example, seat pitch between at least two seats may change).

With those needs in mind, certain embodiments provide a vehicle including an internal cabin, a plurality of passenger service units (PSUs) within the internal cabin, and an emergency oxygen system within the internal cabin. The emergency oxygen system is separate and distinct from the plurality of PSUs.

In at least one embodiment, the emergency oxygen system includes a plurality of oxygen assemblies. In at least one embodiment, the plurality of oxygen assemblies are uncoupled from seat pitch. In at least one embodiment, each of the plurality of oxygen assemblies includes a mask and a fluid conduit.

In at least one embodiment, the emergency oxygen system further includes an oxygen supply in fluid communication with the plurality of oxygen assemblies. For example, the oxygen supply includes an oxygen canister fluidly coupled to the fluid conduit. As another example, the oxygen supply includes an oxygen tank fluidly coupled to a plurality of fluid conduits via a manifold.

In at least one embodiment, the emergency oxygen system further includes a rail extending along a length of the internal cabin. The rail retains the plurality of oxygen assemblies.

The emergency oxygen system can be disposed between a sidewall of the vehicle and the plurality of PSUs.

In at least one embodiment, a partition wall separates the emergency oxygen system from the plurality of PSUs.

In at least one embodiment, one or more stowage bin assemblies are within the internal cabin. One or more of the plurality of PSUs are disposed between the one or more stowage bin assemblies and the emergency oxygen system.

Certain embodiments of the present disclosure provide a method including providing a plurality of passenger service units (PSUs) within an internal cabin of a vehicle, and providing an emergency oxygen system within the internal cabin, wherein the emergency oxygen system is separate and distinct from the plurality of PSUs.

BRIEF DESCRIPTION OF THE DRAWINGS

FIG. 3A illustrates a top plan view of an internal cabin of an aircraft, according to an embodiment of the present disclosure.

FIG. 3B illustrates a top plan view of an internal cabin of an aircraft, according to an embodiment of the present disclosure.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

As described herein, embodiments of the present disclosure provide an emergency oxygen system that is separate and distinct from personal service units (PSUs) within an internal cabin of an aircraft. In particular, oxygen assemblies of the system are uncoupled from the PSUs. The oxygen assemblies are not within the PSUs. Further, the oxygen assemblies are uncoupled from seat pitch. That is, locations of the oxygen assemblies are not dependent upon seat pitch.

Separating the emergency oxygen system from the PSUs allows for easier seat reconfiguration within the internal cabin and shorter pitch between seats. Further, the emergency oxygen systems described herein reduce variability in configurations, thereby reducing recurring engineering time. Also, embodiments of the present disclosure increase available space within PSUs, thereby allowing for additional components therein.

In at least one embodiment, the emergency oxygen system includes a rail that extends over a length of the internal cabin. The rail is separated from the PSUs. The rail includes the oxygen assemblies, such as may include masks and fluid conduits, which are in fluid communication with an oxygen supply.

In at least one embodiment, the oxygen assemblies are longitudinally arrayed along a length of the internal cabin. The oxygen assemblies are spaced apart to ensure passengers within the internal cabin have access thereto, regardless of the pitch between seat assemblies. For example, the internal cabin can be reconfigured to change pitch between seat assemblies and oxygen assemblies are still readily and easily available for each seat within the internal cabin.

Figure 1:
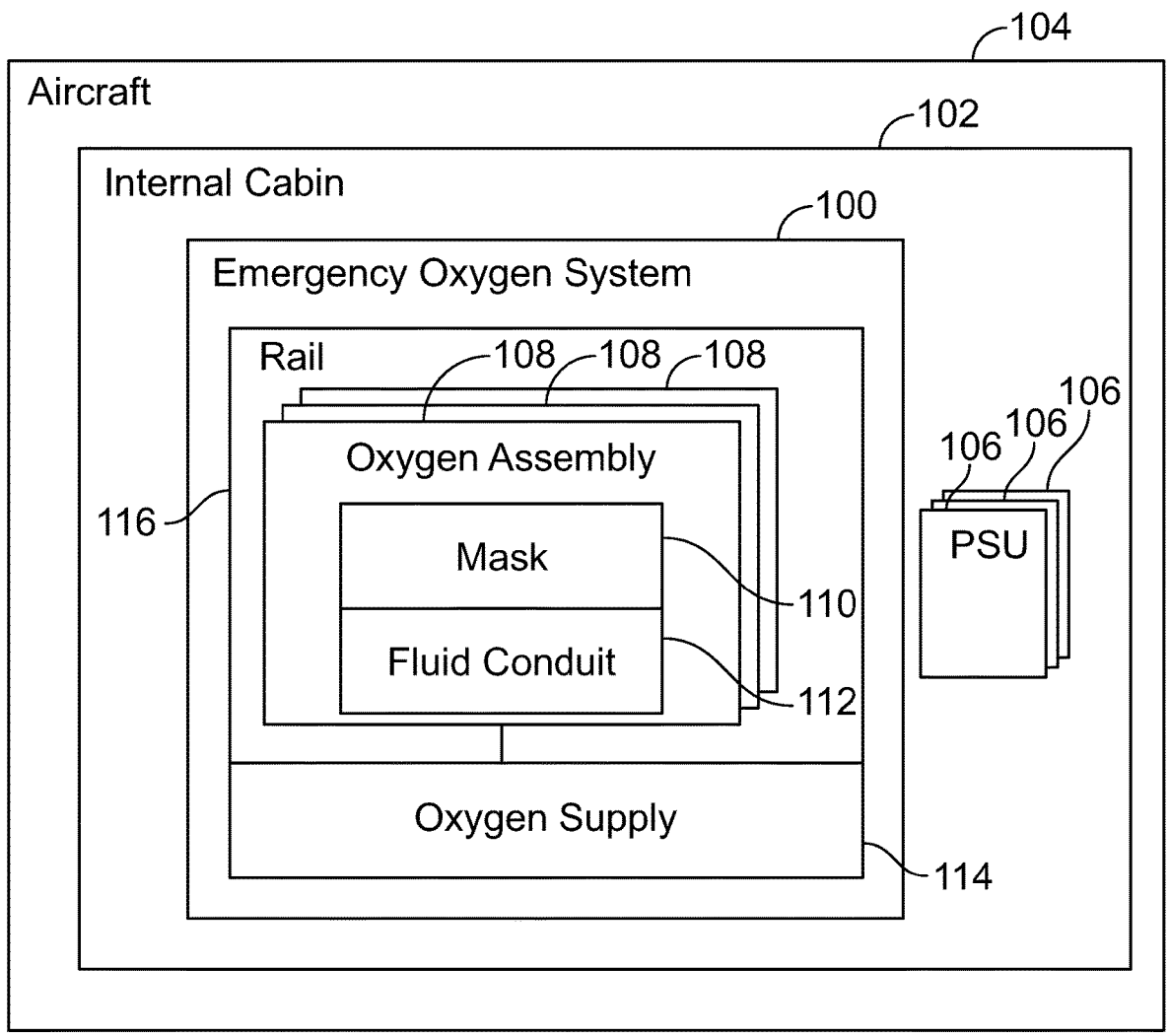
FIG. 1 illustrates a schematic block diagram of an emergency oxygen system within an internal cabin of an aircraft, according to an embodiment of the present disclosure.

FIG. 1 illustrates a schematic block diagram of an emergency oxygen system 100 within an internal cabin 102 of an aircraft 104, according to an embodiment of the present disclosure. The emergency oxygen system 100 is separate and distinct from personal service units (PSUs) 106 within the internal cabin 102. In particular, the PSUs 106 do not include the emergency oxygen system 100, and vice versa.

The emergency oxygen system 100 includes a plurality of oxygen assemblies 108. The oxygen assemblies 108 include a mask 110 and a fluid conduit 112. During a sudden cabin depressurization, the oxygen assemblies 108 are configured to deploy (such as drop down). An oxygen supply 114 is in fluid communication with the fluid conduits 112. In at least one embodiment, each oxygen assembly 108 is in fluid communication with a respective oxygen supply 114, such as an oxygen canister fluidly coupled to the fluid conduit 112. In at least one other embodiment, an oxygen supply 114 such as an oxygen tank or cylinder is in fluid communication with a plurality of fluid conduits 112 of oxygen assemblies 108, such as via a manifold.

In at least one embodiment, the emergency oxygen system 100 includes a rail 116 that extends along a length of the internal cabin 102. The rail 116 retains the oxygen assemblies 108, such as at a position above and/or to the side of seats within the internal cabin 102. At least a portion of the oxygen supply 114 may also be retained by the rail 116. Optionally, the rail 116 does not retain the oxygen supply 114. Also, optionally, the emergency oxygen system 100 may not include the rail 116. Instead, the oxygen assemblies 108 may be secured to portions of the internal cabin (such as side walls, a ceiling, a floor, or the like) within the use of a rail.

The oxygen assemblies 108 are separate and distinct from the PSUs 106. The oxygen assemblies 108 are uncoupled from the PSUs 106. The PSUs 106 do not include the oxygen assemblies 108.

As described herein, a vehicle (such as the aircraft 104) includes the internal cabin 102. A plurality of PSUs 106 are within the internal cabin 102. The emergency oxygen system 100 is within the internal cabin 102. The emergency oxygen system 100 is separate and distinct from the plurality of PSUs 106.

Figure 2:
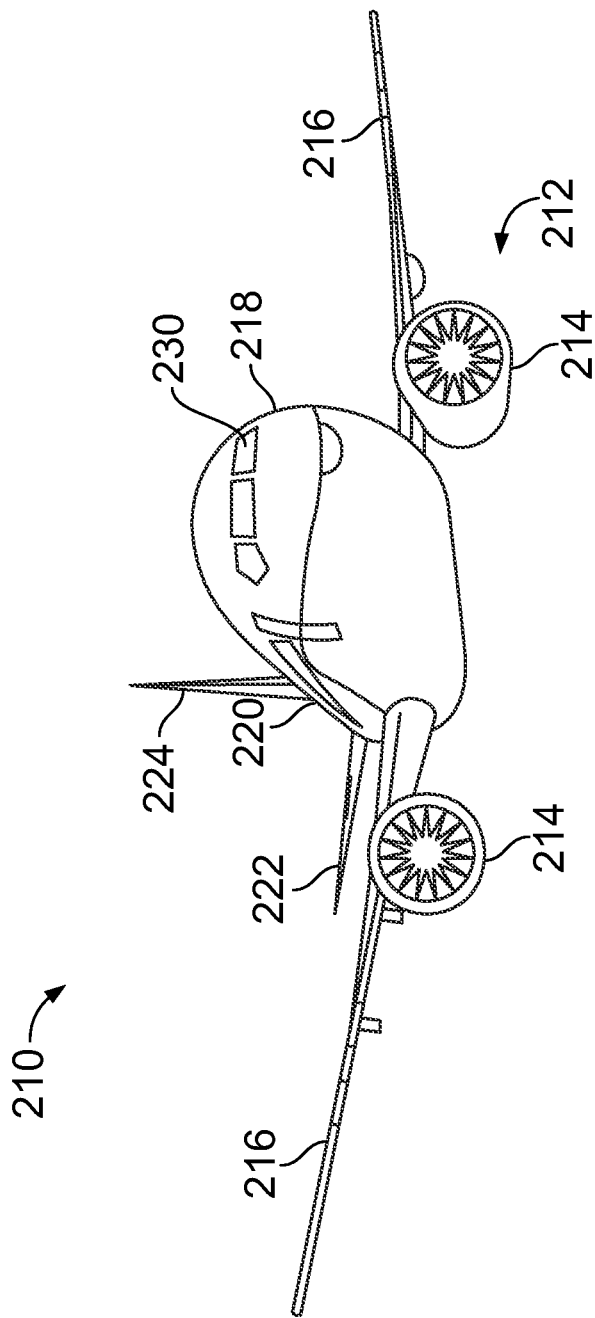
FIG. 2 illustrates a perspective front view of an aircraft, according to an embodiment of the present disclosure.

FIG. 2 illustrates a perspective front view of an aircraft 210, according to an embodiment of the present disclosure. The aircraft 210 is an example of the aircraft 104, shown in FIG. 1. The aircraft 210 includes a propulsion system 212 that includes engines 214, for example. Optionally, the propulsion system 212 may include more engines 214 than shown. The engines 214 are carried by wings 216 of the aircraft 210. In other embodiments, the engines 214 may be carried by a fuselage 218 and/or an empennage 220. The empennage 220 may also support horizontal stabilizers 222 and a vertical stabilizer 224.

The fuselage 218 of the aircraft 210 defines an internal cabin 230, which includes a flight deck or cockpit, one or more work sections (for example, galleys, personnel carry-on baggage areas, and the like), one or more passenger sections (for example, first class, business class, and coach sections), one or more lavatories, and/or the like. The internal cabin 230 is an example of the internal cabin 102, as shown in FIG. 1.

Alternatively, instead of an aircraft, embodiments of the present disclosure may be used with various other vehicles, such as automobiles, buses, locomotives and train cars, watercraft, and the like. Further, embodiments of the present disclosure may be used with respect to fixed structures, such as commercial and residential buildings.

FIG. 3A illustrates a top plan view of an internal cabin 230 of an aircraft, according to an embodiment of the present disclosure. The internal cabin 230 may be within the fuselage 232 of the aircraft, such as the fuselage 218 of FIG. 2. For example, one or more fuselage walls may define the internal cabin 230. The internal cabin 230 includes multiple areas, including a front section 233, a first-class section 234, a business class section 236, a front galley station 238, an expanded economy or coach section 240, a standard economy of coach section 242, and an aft section 244. It is to be understood that the internal cabin 230 may include more or less areas than shown. For example, the internal cabin 230 may not include a first-class section, and may include more or less galley stations than shown. Each of the sections may be separated by a cabin transition area 246, which may include class divider assemblies between aisles.

As shown in FIG. 3A, the internal cabin 230 includes two aisles 250 and 252 that lead to the aft section 244. Optionally, the internal cabin 230 may have less or more aisles than shown. For example, the internal cabin 230 may include a single aisle that extends through the center of the internal cabin 230 that leads to the aft section 244.

The emergency oxygen system 100 shown in FIG. 1 can be disposed within the internal cabin 230. For example, the rail 116 can extend along a length of the internal cabin 230.

FIG. 3B illustrates a top plan view of an internal cabin 280 of an aircraft, according to an embodiment of the present disclosure. The internal cabin 280 is an example of the internal cabin 230 shown in FIG. 2. The internal cabin 280 may be within a fuselage 281 of the aircraft. For example, one or more fuselage walls may define the internal cabin 280. The internal cabin 280 includes multiple areas, including a main cabin 282 having passenger seats, and an aft section 285 behind the main cabin 282. It is to be understood that the internal cabin 280 may include more or less areas than shown.

The internal cabin 280 may include a single aisle 284 that leads to the aft section 285. The single aisle 284 may extend through the center of the internal cabin 280 that leads to the aft section 285. For example, the single aisle 284 may be coaxially aligned with a central longitudinal plane of the internal cabin 280.

The emergency oxygen system 100 shown in FIG. 1 can be disposed within the internal cabin 280. For example, the rail 116 can extend along a length of the internal cabin 280.

Figure 4:
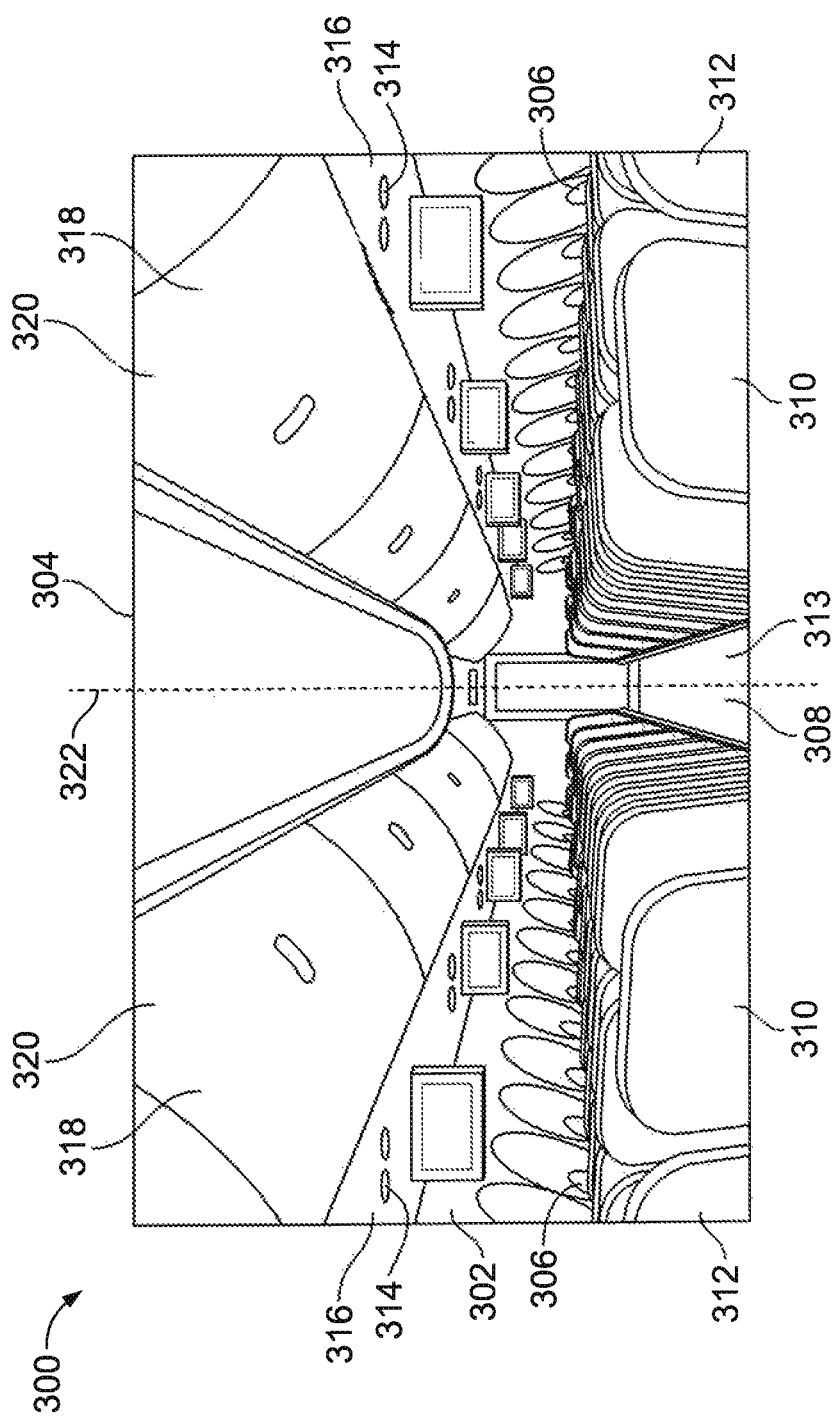
FIG. 4 illustrates a perspective interior view of an internal cabin of an aircraft, according to an embodiment of the present disclosure.

FIG. 4 illustrates a perspective interior view of an internal cabin 300 of an aircraft, according to an embodiment of the present disclosure. The internal cabin 300 is an example of the internal cabin 102 shown in FIG. 1. The internal cabin 300 includes outboard walls 302 connected to a ceiling 304. Windows 306 may be formed within the outboard walls 302. A floor 308 supports rows of seats 310. As shown in FIG. 4, a row 312 may include two seats 310 on either side of an aisle 313. However, the row 312 may include more or less seats 310 than shown. Additionally, the internal cabin 300 may include more aisles than shown.

PSUs 314 are secured between an outboard wall 302 and the ceiling 304 on either side of the aisle 313. The PSUs 314 extend between a front end and rear end of the internal cabin 300. For example, a PSU 314 may be positioned over each seat 310 within a row 312. Each PSU 314 may include a housing 316 that generally contains vents, reading lights, an attendant request button, and other such controls over each seat 310 (or groups of seats) within a row 312. Notably, the PSUs 314 do not include the oxygen assemblies 108 shown in FIG. 1.

Overhead stowage bin assemblies 318 are secured to the ceiling 304 and/or the outboard wall 302 above and inboard from the PSU 314 on either side of the aisle 313. The overhead stowage bin assemblies 318 are secured over the seats 310. The overhead stowage bin assemblies 318 extend between the front and rear end of the internal cabin 300. Each stowage bin assembly 318 may include a pivot bin or bucket 320 pivotally secured to a strongback. The overhead stowage bin assemblies 318 may be positioned above and inboard from lower surfaces of the PSUs 314. The overhead stowage bin assemblies 318 are configured to be pivoted open in order to receive passenger carry-on baggage and personal items, for example.

As used herein, the term "outboard" means a position that is further away from a central longitudinal plane 322 of the internal cabin 300 as compared to another component. The term "inboard" means a position that is closer to the central longitudinal plane 322 of the internal cabin 300 as compared to another component. For example, a lower surface of a PSU 314 may be outboard in relation to a stowage bin assembly 318.

Figure 5:
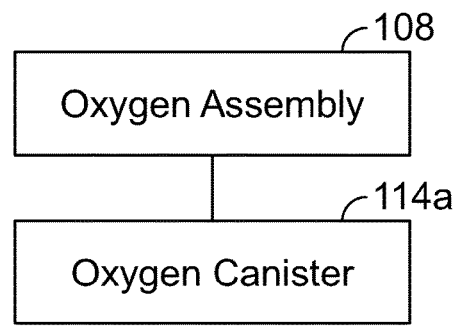
FIG. 5 illustrates a schematic block diagram of an oxygen supply coupled to an oxygen assembly, according to an embodiment of the present disclosure.

FIG. 5 illustrates a schematic block diagram of an oxygen supply 114a coupled to an oxygen assembly 108, according to an embodiment of the present disclosure. As shown, each oxygen assembly 108 can be coupled to a respective oxygen supply 114a, such as an oxygen canister in direct fluid communication with the fluid conduit 112 (shown in FIG. 1).

Figure 6:
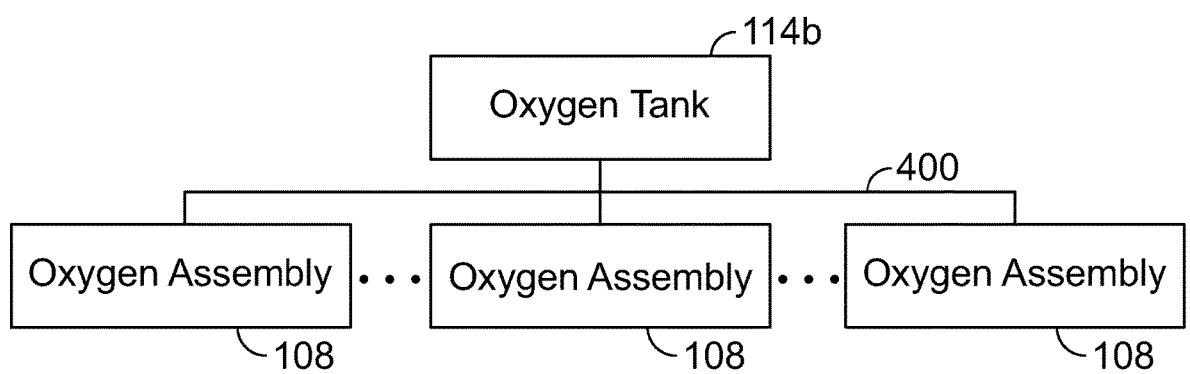
FIG. 6 illustrates a schematic block diagram of an oxygen supply coupled to a plurality of oxygen assemblies, according to an embodiment of the present disclosure.

FIG. 6 illustrates a schematic block diagram of an oxygen supply 114b coupled to a plurality of oxygen assemblies 108, according to an embodiment of the present disclosure. For example, the oxygen supply 114b is an oxygen tank or cylinder in fluid communication with a plurality of oxygen assemblies 108 through a fluid manifold 400. Referring to FIGS. 1 and 6, a single oxygen supply 114b can be in fluid communication with all of the oxygen assemblies 108 within the internal cabin 102. Optionally, multiple oxygen supplies 114b can be located within the internal cabin 102, each of which can be in fluid communication with a subset of the oxygen assemblies 108.

Figure 7:
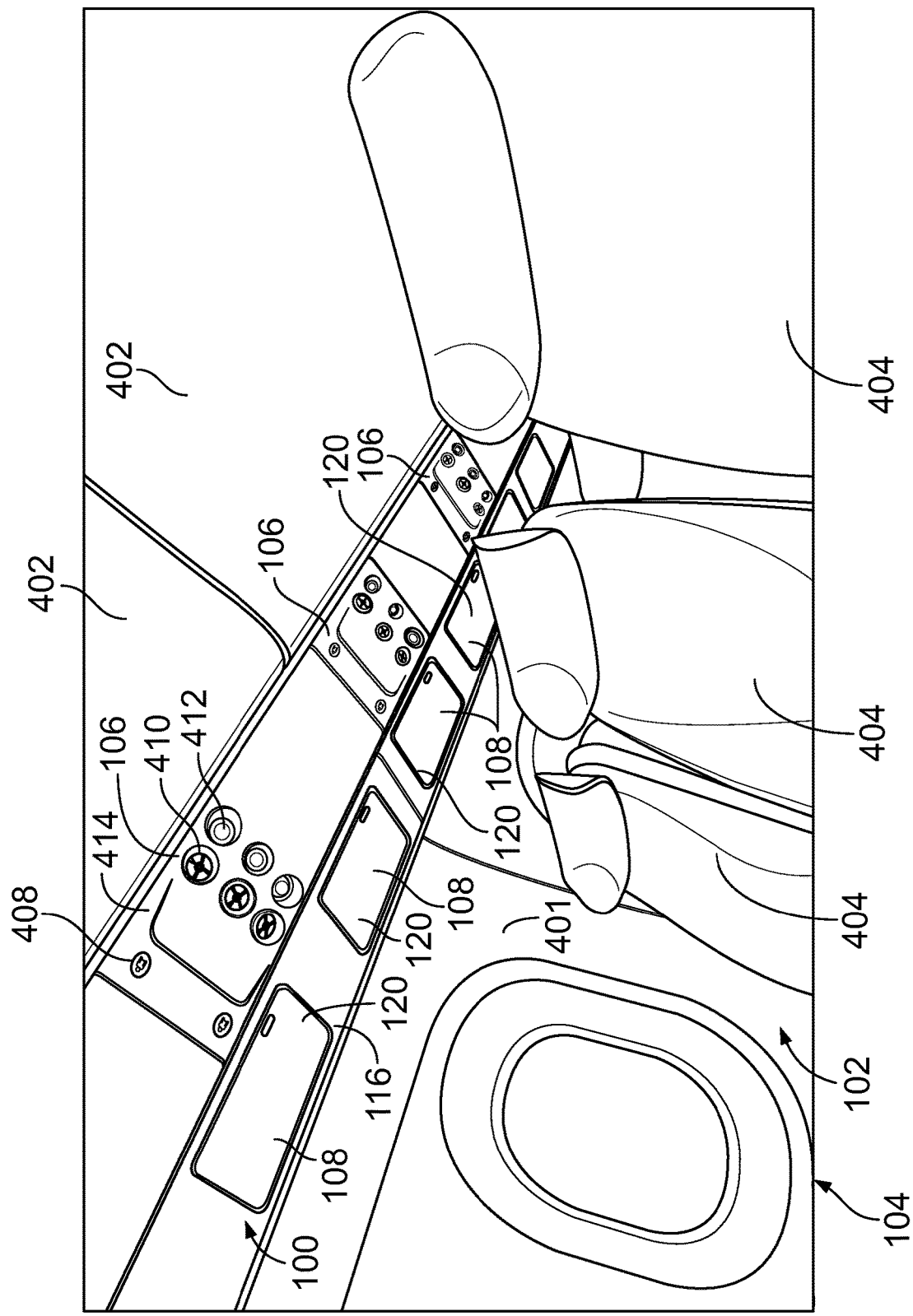
FIG. 7 illustrates a perspective internal view of an internal cabin of an aircraft, according to an embodiment of the present disclosure.

FIG. 7 illustrates a perspective internal view of an internal cabin 102 of an aircraft 104, according to an embodiment of the present disclosure. As shown, the emergency oxygen system 100 includes the rail 116 that extends along a length of the internal cabin 102. The rail 116 retains the oxygen assemblies 108, such as may include oxygen drop panels 120. Referring to FIGS. 1 and 7, the masks 110 and fluid conduits 112 are disposed above the oxygen drop panels 120 when the oxygen assemblies 108 are in stowed positions, as shown in FIG. 7.

The emergency oxygen system 100 is shown outboard from the PSUs 106. That is, the emergency oxygen system 100 is disposed closer to a sidewall 401 than the PSUs 106. Stowage bin assemblies 402 can be inboard from the PSUs 106. Optionally, the emergency oxygen system 100 can be inboard from the PSUs 106. The emergency oxygen system 100 is disposed over and/or to sides of seats 404 within the internal cabin 102.

The PSUs 106 can include attendant lights 408, gaspers 410, and reading lights 412. For example, each PSU 106 includes a panel 414 that retains at least a portion of an attendant light 408, a gasper 410, and a reading light 412. In contrast, the oxygen system 100 does not include the PSUs 106, or portions thereof (such as the lights 408, gaspers 410, and reading lights 412).

Figure 8:
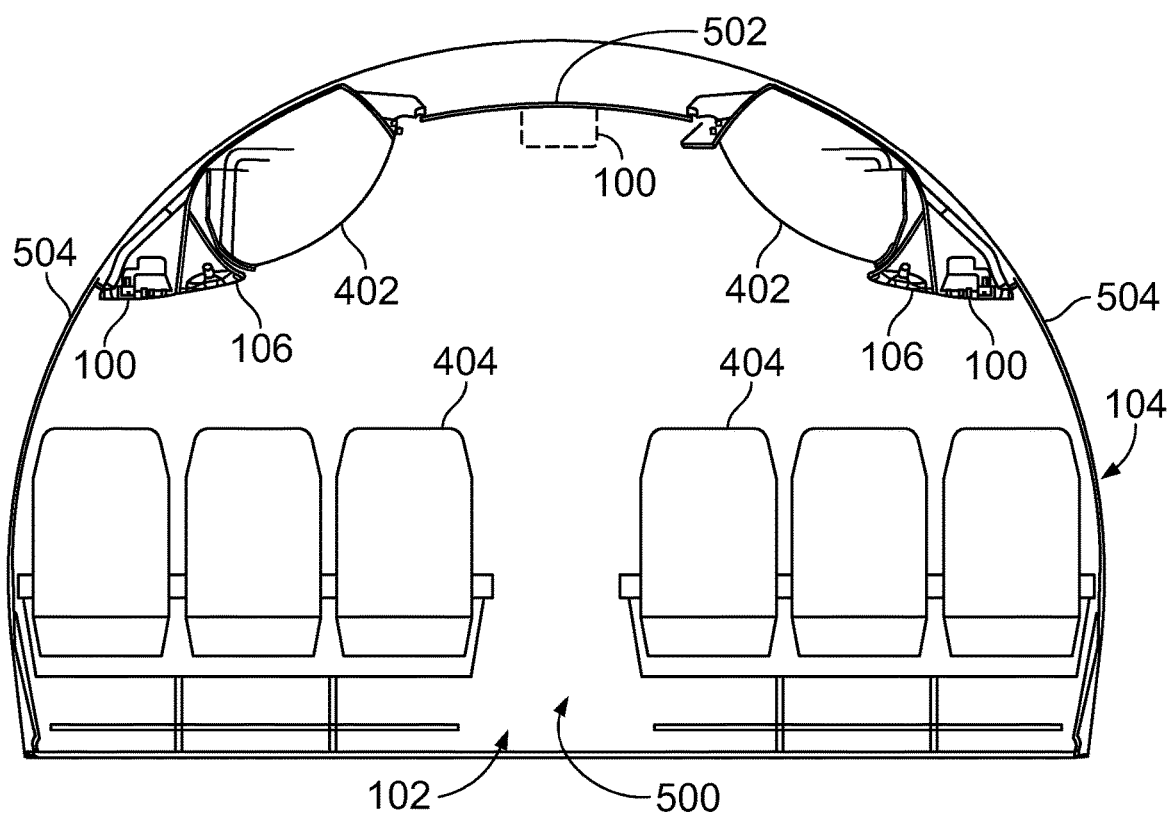
FIG. 8 illustrates an axial cross-sectional view of an internal cabin of an aircraft, according to an embodiment of the present disclosure.

FIG. 8 illustrates a perspective internal view of an internal cabin 102 of an aircraft 104, according to an embodiment of the present disclosure. The aircraft 104 can include a single aisle 500. Emergency oxygen systems 100 can be disposed to each side of the aisle 500. The emergency oxygen systems 100 extend along a length of the internal cabin 102.

Optionally, the internal cabin 102 can include multiple aisles. An emergency oxygen system 100 can be disposed above a center section of seats 404 between the aisles.

In at least one embodiment, an emergency oxygen system 100 can be secured to a ceiling 502 over the aisle 500. The emergency oxygen system 100 can be in addition to, or in place of, the emergency oxygen systems 100 shown proximate to the side walls 504.

Figure 9:
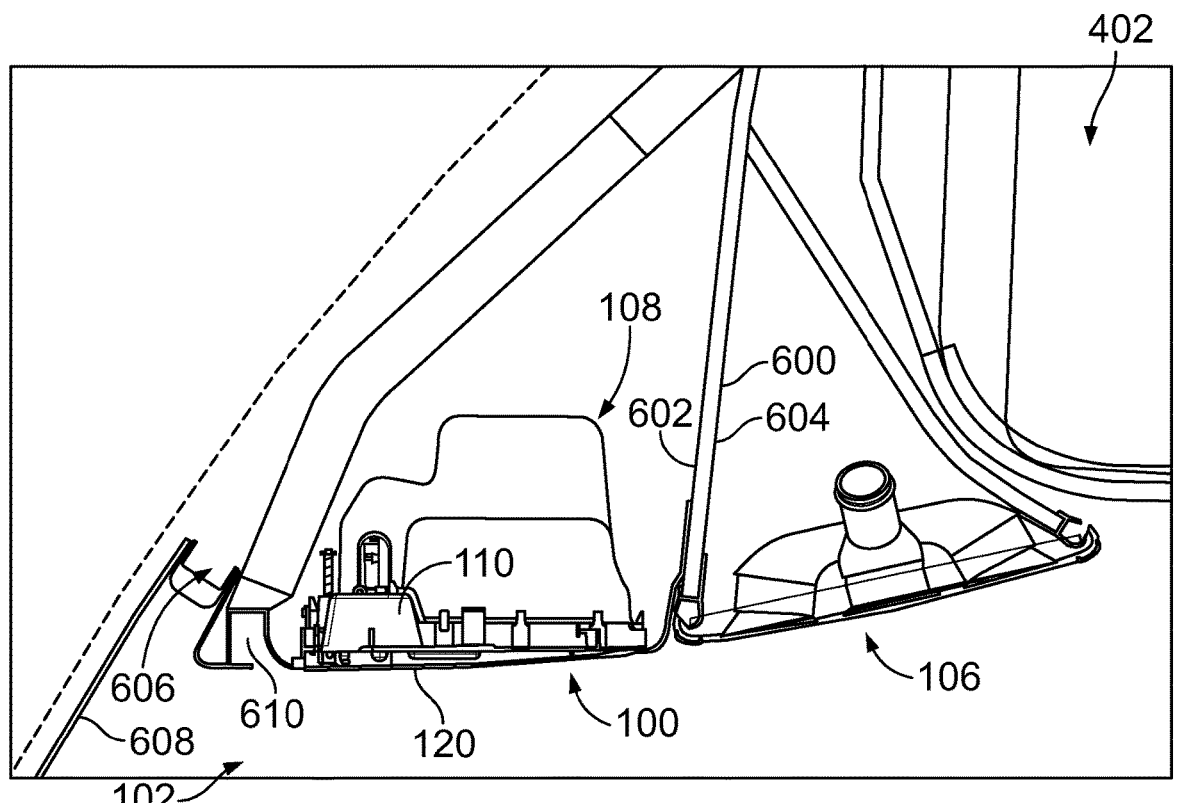
FIG. 9 illustrates an axial cross-sectional view of an oxygen assembly of an emergency oxygen system within an internal cabin, according to an embodiment of the present disclosure.

FIG. 9 illustrates an axial cross-sectional view of an oxygen assembly 108 of an emergency oxygen system 100 within an internal cabin 102, according to an embodiment of the present disclosure. As shown, the emergency oxygen system 100 is separate and distinct from the PSU 106. In at least one embodiment, a partition wall 600 separates the emergency oxygen system 100 from the PSUs 106. The oxygen assemblies 108 are mounted to a first side 602 of the partition wall 600, while the PSUs 106 are mounted to a second side 604 (opposite from the first side 602) of the partition wall 600.

As shown, the emergency oxygen system 100 is outboard in relation to the PSUs 106, which, in turn, can be outboard in relation to the stowage bin assemblies 402. A light fixture 606 can be disposed between a sidewall 608 and an environmental control system (ECS) 610, such as may include vents. The emergency oxygen system 100 can be disposed between the ECS 610 and the PSUs 106.

The emergency oxygen system 100 is separate from the PSUs 106 and the stowage bin assemblies 402. That is, neither the PSUs 106, nor the stowage bin assemblies 402, include the emergency oxygen system 100. The PSUs 106 can also be separate and distinct from the stowage bin assemblies 402.

In at least one embodiment, the emergency oxygen system 100 can extend along lengths of the internal cabin 102 that do not include stowage bin assemblies 402. Further, the positions of the emergency oxygen system 100 and the PSUs 106 can be switched, such that the PSUs 106 are outboard in relation to the emergency oxygen system 100.

Figure 10:
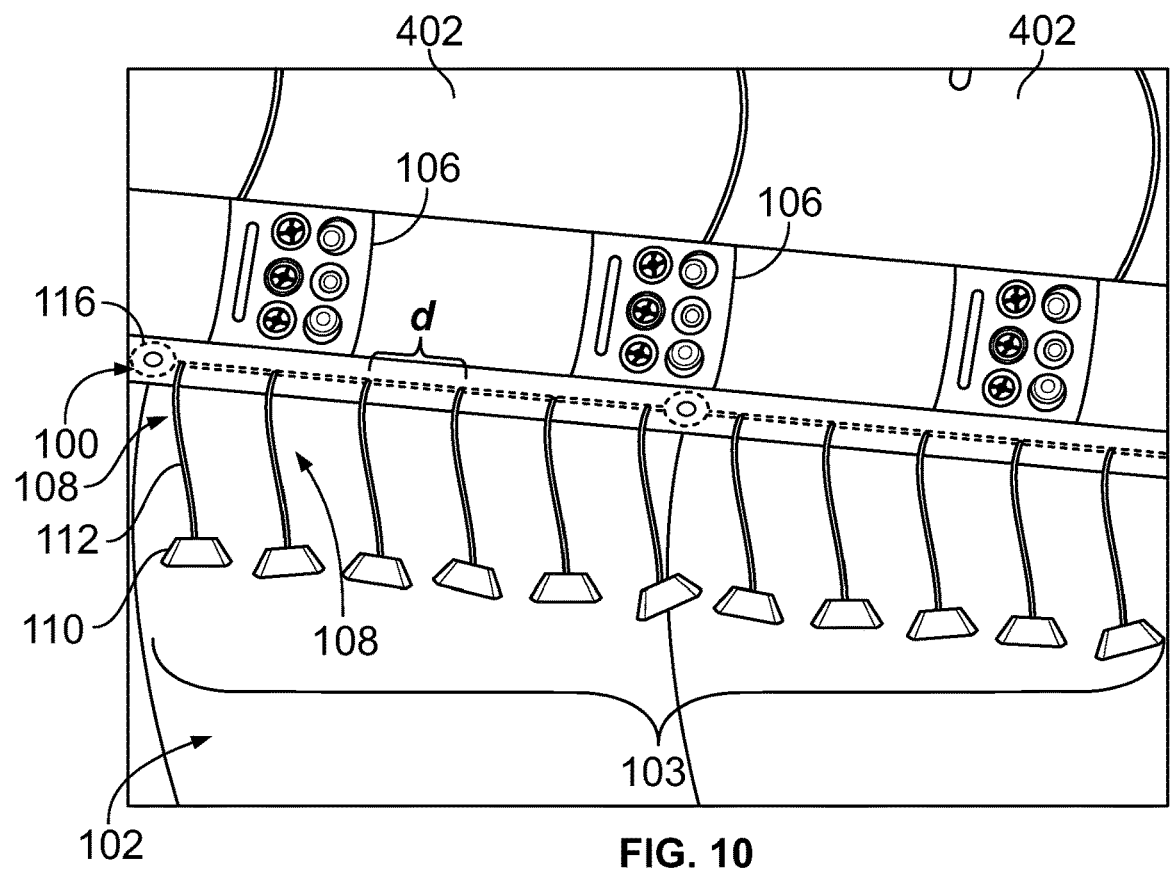
FIG. 10 illustrates a lateral view of an emergency oxygen system within an internal cabin, according to an embodiment of the present disclosure.

FIG. 10 illustrates a lateral view of the emergency oxygen system 100 within an internal cabin 102, according to an embodiment of the present disclosure. As shown, the oxygen assemblies 108 are in deployed positions (for example, dropped down past oxygen drop panels). The oxygen assemblies 108 are retained by the rail 116, which extends along a length 103 of the internal cabin 102.

Neighboring (that is, closest) oxygen assemblies 108 are separated a distance d from one another. In at least one embodiment, the distance d is between 3-10 inches. For example, the distance d can be 5 inches. Spacing the oxygen assemblies 108 in such a manner ensures that the oxygen assemblies 108 are readily available for passengers within the internal cabin 102 regardless of seat pitch. That is, the oxygen assemblies 108 are not dependent upon seat pitch. Instead, the oxygen assemblies 108 are uncoupled from seat pitch.

Figure 11:
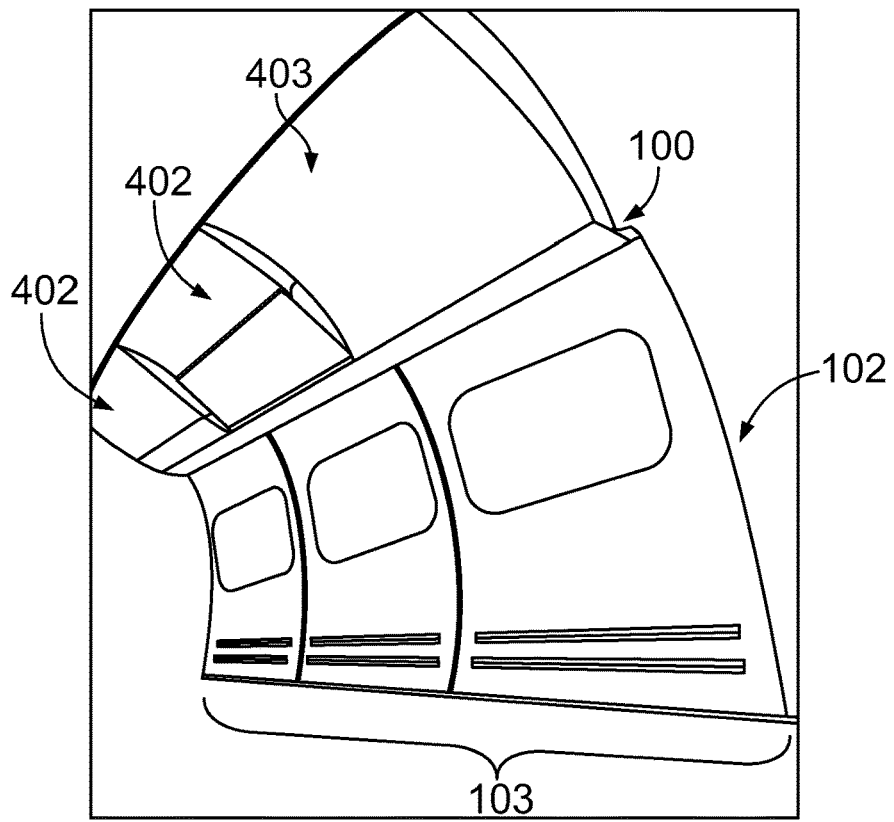
FIG. 11 illustrates a perspective lateral view of an emergency oxygen system within an internal cabin, according to an embodiment of the present disclosure.

FIG. 11 illustrates a perspective lateral view of the emergency oxygen system 100 within an internal cabin 102, according to an embodiment of the present disclosure. The emergency oxygen system 100 extends along the length 103, which may include areas having stowage bin assemblies 402, and areas 403 that are devoid of stowage bin assemblies 402. In at least one example, the internal cabin 102 may not include any stowage bins.

Figure 12:
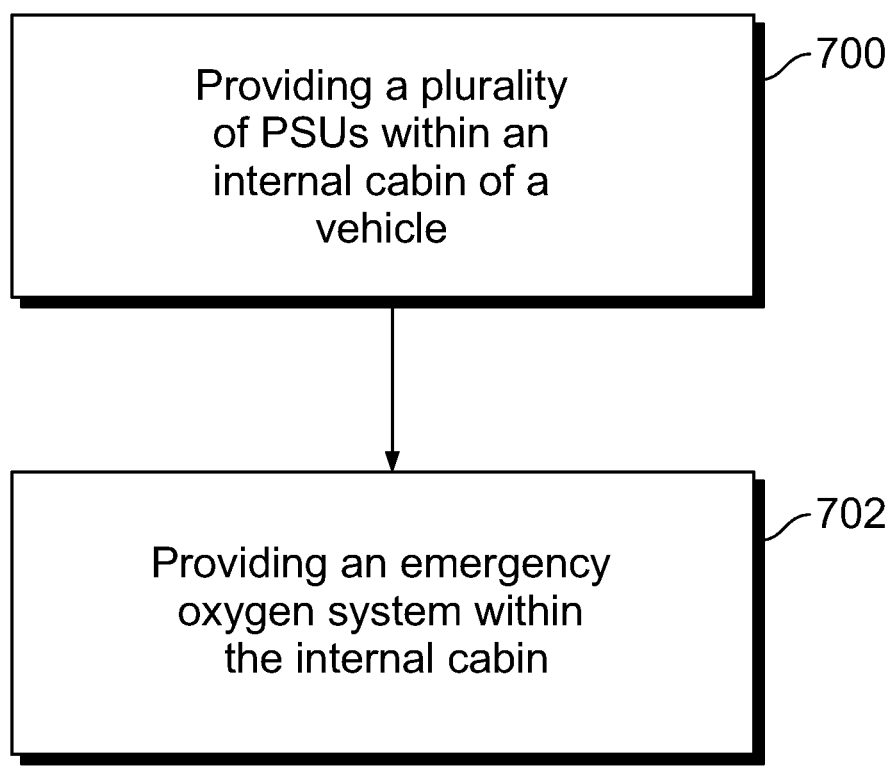
FIG. 12 illustrates a flow chart of a method, according to an embodiment of the present disclosure.

FIG. 12 illustrates a flow chart of a method, according to an embodiment of the present disclosure. Referring to FIGS. 1-12, the method includes providing, at 700, a plurality of passenger service units (PSUs) 106 within an internal cabin 102 of a vehicle 104; and providing, at 702, an emergency oxygen system 100 within the internal cabin 102, wherein the emergency oxygen system 100 is separate and distinct from the plurality of PSUs 106.

In at least one embodiment, the method also includes fluidly coupling an oxygen supply 114 with the plurality of oxygen assemblies 108. For example, said fluidly coupling includes fluidly coupling an oxygen canister 114a to the fluid conduit 112. That is, each oxygen assembly 108 can be coupled to its own respective oxygen canister 114a. As another example, said fluidly coupling includes fluidly coupling an oxygen tank 114b to the plurality of fluid conduits 112 via a manifold 400.

In at least one embodiment, the method also includes retaining the plurality of oxygen assemblies 108 by a rail 116 extending along a length 103 of the internal cabin 102.

In at least one embodiment, the method also includes disposing the emergency oxygen system 100 between a sidewall 504 of the vehicle 104 and the plurality of PSUs 106.

In at least one embodiment, the method also includes separating the emergency oxygen system 100 from the plurality of PSUs 106 by a partition wall 600.

In at least one embodiment, the method also includes disposing one or more of the plurality of PSUs 106 between one or more stowage bin assemblies 402 and the emergency oxygen system 100.

In at least one embodiment, a method includes installing an oxygen system separately from PSU and components of PSU. In at least one embodiment, the method includes installing the oxygen system independently from seat pitch.

Further, the disclosure comprises embodiments according to the following clauses:

Clause 1. A vehicle, comprising:
an internal cabin;
a plurality of passenger service units (PSUs) within the internal cabin; and
an emergency oxygen system within the internal cabin, wherein the emergency oxygen system is separate and distinct from the plurality of PSUs.

Clause 2. The vehicle of Clause 1, wherein the emergency oxygen system comprises a plurality of oxygen assemblies, and wherein the plurality of oxygen assemblies are uncoupled from seat pitch.

Clause 3. The vehicle of Clause 2, wherein each of the plurality of oxygen assemblies comprises a mask and a fluid conduit.

Clause 4. The vehicle of Clauses 2 or 3, wherein the emergency oxygen system further comprises an oxygen supply in fluid communication with the plurality of oxygen assemblies.

Clause 5. The vehicle of Clause 4, wherein the oxygen supply comprises an oxygen canister fluidly coupled to the fluid conduit.

Clause 6. The vehicle of Clause 4, wherein the oxygen supply comprises an oxygen tank fluidly coupled to a plurality of fluid conduits via a manifold.

Clause 7. The vehicle of any of Clauses 2-6, wherein the emergency oxygen system further comprises a rail extending along a length of the internal cabin, wherein the rail retains the plurality of oxygen assemblies.

Clause 8. The vehicle of any of Clauses 1-7, wherein the emergency oxygen system is disposed between a sidewall of the vehicle and the plurality of PSUs.

Clause 9. The vehicle of any of Clauses 1-8, further comprising a partition wall that separates the emergency oxygen system from the plurality of PSUs.

Clause 10. The vehicle of any of Clauses 1-9, further comprising one or more stowage bin assemblies within the internal cabin, wherein one or more of the plurality of PSUs are disposed between the one or more stowage bin assemblies and the emergency oxygen system.

Clause 11. A method, comprising:
providing a plurality of passenger service units (PSUs) within an internal cabin of a vehicle; and
providing an emergency oxygen system within the internal cabin, wherein the emergency oxygen system is separate and distinct from the plurality of PSUs.

Clause 12. The method of Clause 11, wherein the emergency oxygen system comprises a plurality of oxygen assemblies, wherein each of the plurality of oxygen assemblies comprises a mask and a fluid conduit.

Clause 13. The method of Clause 12, further comprising fluidly coupling an oxygen supply with the plurality of oxygen assemblies.

Clause 14. The method of Clause 13, wherein said fluidly coupling comprises fluidly coupling an oxygen canister to the fluid conduit.

Clause 15. The method of Clause 13, wherein said fluidly coupling comprises fluidly coupling an oxygen tank to a plurality of fluid conduits via a manifold.

Clause 16. The method of any of Clauses 12-15, further comprising retaining the plurality of oxygen assemblies by a rail extending along a length of the internal cabin.

Clause 17. The method of any of Clauses 11-16, further comprising disposing the emergency oxygen system between a sidewall of the vehicle and the plurality of PSUs.

Clause 18. The method of any of Clauses 11-17, further comprising separating the emergency oxygen system from the plurality of PSUs by a partition wall.

Clause 19. The method of any of Clauses 11-18, further comprising disposing one or more of the plurality of PSUs between one or more stowage bin assemblies and the emergency oxygen system.

Clause 20. A vehicle, comprising:
an internal cabin;
a plurality of passenger service units (PSUs) within the internal cabin;
an emergency oxygen system within the internal cabin, wherein the emergency oxygen system comprises:
a plurality of oxygen assemblies, wherein each of the plurality of oxygen assemblies comprises a mask and a fluid conduit;
a rail extending along a length of the internal cabin, wherein the rail retains the plurality of oxygen assemblies; and
an oxygen supply in fluid communication with the plurality of oxygen assemblies,
wherein the emergency oxygen system is separate and distinct from the plurality of PSUs; and
one or more stowage bin assemblies within the internal cabin, wherein one or more of the plurality of PSUs are disposed between the one or more stowage bin assemblies and the emergency oxygen system.

As described herein, embodiments of the present disclosure provide systems and methods for freeing up space within PSUs. Further, embodiments of the present disclosure provide systems and methods that ensure emergency oxygen assemblies are easily and readily available within an internal cabin of an aircraft even if seats within the internal cabin are reconfigured. The emergency oxygen systems and methods described herein reduce time and labor costs associated with manufacture and reconfiguration of internal cabins of aircraft, as there is no need to adjust mounting positions for oxygen assemblies (which were previously within PSUs).

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:
1. A vehicle, comprising:
an internal cabin;
a plurality of passenger service units (PSUs) within the internal cabin;
an emergency oxygen system within the internal cabin, wherein the emergency oxygen system is distinct and separated from the plurality of PSUs;
one or more stowage bin assemblies within the internal cabin, wherein one or more of the plurality of PSUs are disposed between the one or more stowage bin assemblies and the emergency oxygen system; and
a partition wall that separates the emergency oxygen system from the plurality of PSUs, wherein the emergency oxygen system is mounted to a first side of the partition wall, and the plurality of PSUs are mounted to a second side of the partition wall opposite from the first side.

2. The vehicle of claim 1, wherein the emergency oxygen system comprises a plurality of oxygen assemblies, and wherein the plurality of oxygen assemblies are uncoupled from seat pitch.

3. The vehicle of claim 2, wherein each of the plurality of oxygen assemblies comprises a mask and a fluid conduit.

4. The vehicle of claim 3, wherein the emergency oxygen system further comprises an oxygen supply in fluid communication with the plurality of oxygen assemblies.

5. The vehicle of claim 4, wherein the oxygen supply comprises an oxygen canister fluidly coupled to the fluid conduit.

6. The vehicle of claim 4, wherein the oxygen supply comprises an oxygen tank fluidly coupled to a plurality of fluid conduits via a manifold.

7. The vehicle of claim 2, wherein the emergency oxygen system further comprises a rail extending along a length of the internal cabin, wherein the rail retains the plurality of oxygen assemblies.

8. The vehicle of claim 1, wherein the emergency oxygen system is disposed between a sidewall of the vehicle and the plurality of PSUs.

9. The vehicle of claim 1, wherein each of the plurality of PSUs comprises one or more attendant lights, one or more gaspers, and one or more reading lights.

10. A method, comprising:
providing a plurality of passenger service units (PSUs) within an internal cabin of a vehicle;
providing an emergency oxygen system within the internal cabin, wherein the emergency oxygen system is distinct and separated from the plurality of PSUs;
disposing one or more of the plurality of PSUs between one or more stowage bin assemblies and the emergency oxygen system; and
separating the emergency oxygen system from the plurality of PSUs by a partition wall, wherein the emergency oxygen system is mounted to a first side of the partition wall, and the plurality of PSUs are mounted to a second side of the partition wall opposite from the first side.

11. The method of claim 10, wherein the emergency oxygen system comprises a plurality of oxygen assemblies, wherein each of the plurality of oxygen assemblies comprises a mask and a fluid conduit.

12. The method of claim 11, further comprising fluidly coupling an oxygen supply with the plurality of oxygen assemblies.

13. The method of claim 12, wherein said fluidly coupling comprises fluidly coupling an oxygen canister to the fluid conduit.

14. The method of claim 12, wherein said fluidly coupling comprises fluidly coupling an oxygen tank to a plurality of fluid conduits via a manifold.

15. The method of claim 11, further comprising retaining the plurality of oxygen assemblies by a rail extending along a length of the internal cabin.

16. The method of claim 10, further comprising disposing the emergency oxygen system between a sidewall of the vehicle and the plurality of PSUs.

17. A vehicle, comprising:
an internal cabin;
a plurality of passenger service units (PSUs) within the internal cabin;
an emergency oxygen system within the internal cabin, wherein the emergency oxygen system comprises:
a plurality of oxygen assemblies, wherein each of the plurality of oxygen assemblies comprises a mask and a fluid conduit;
a rail extending along a length of the internal cabin, wherein the rail retains the plurality of oxygen assemblies;
an oxygen supply in fluid communication with the plurality of oxygen assemblies, wherein the emergency oxygen system is distinct and separated from the plurality of PSUs;
one or more stowage bin assemblies within the internal cabin, wherein one or more of the plurality of PSUs are disposed between the one or more stowage bin assemblies and the emergency oxygen system; and
a partition wall that separates the emergency oxygen system from the plurality of PSUs, wherein the emergency oxygen system is mounted to a first side of the partition wall, and the plurality of PSUs are mounted to a second side of the partition wall opposite from the first side.

18. The vehicle of claim 17, wherein each of the plurality of PSUs comprises one or more attendant lights, one or more gaspers, and one or more reading lights.

19. The vehicle of claim 17, wherein the plurality of oxygen assemblies are uncoupled from seat pitch.

20. The vehicle of claim 17, wherein the emergency oxygen system is disposed between a sidewall of the vehicle and the plurality of PSUs.

* * * * *